United States Patent Office 3,076,738
Patented Feb. 5, 1963

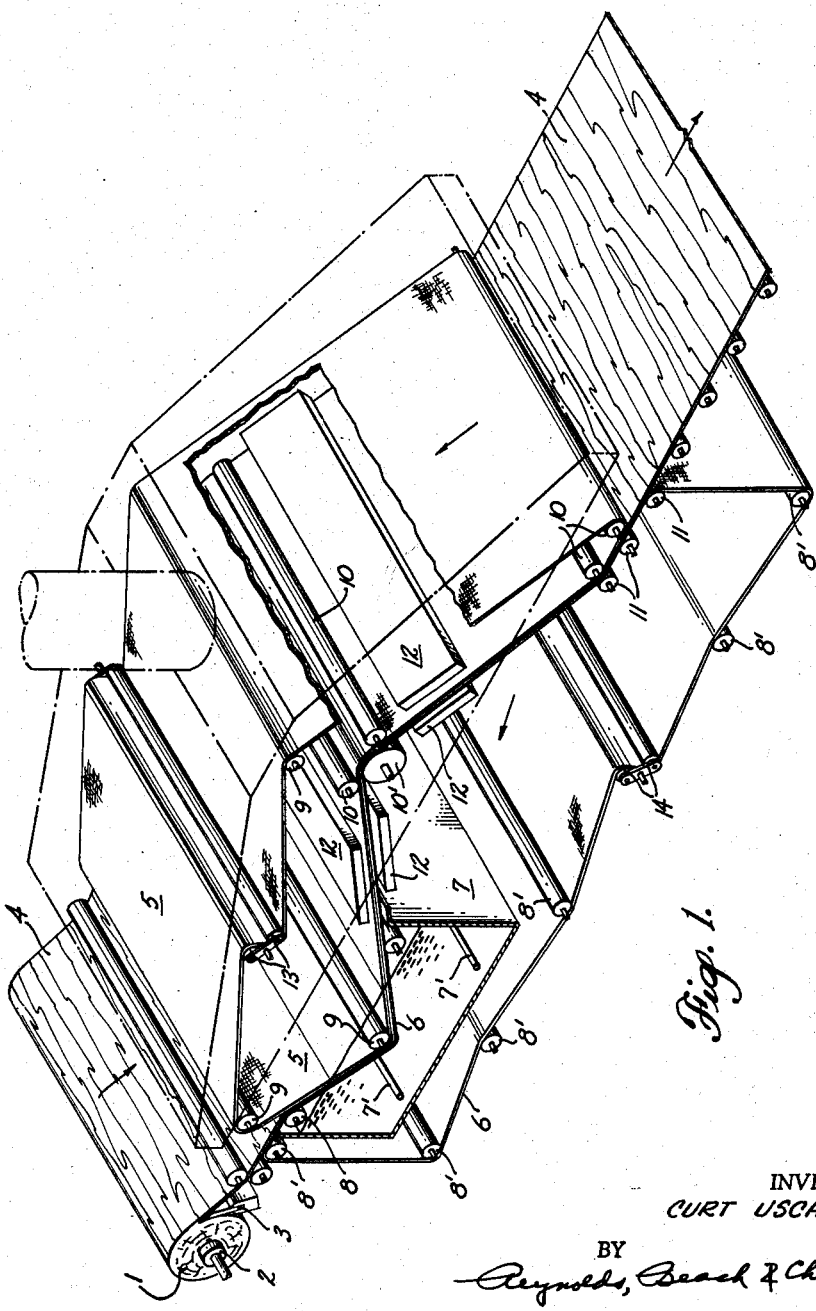

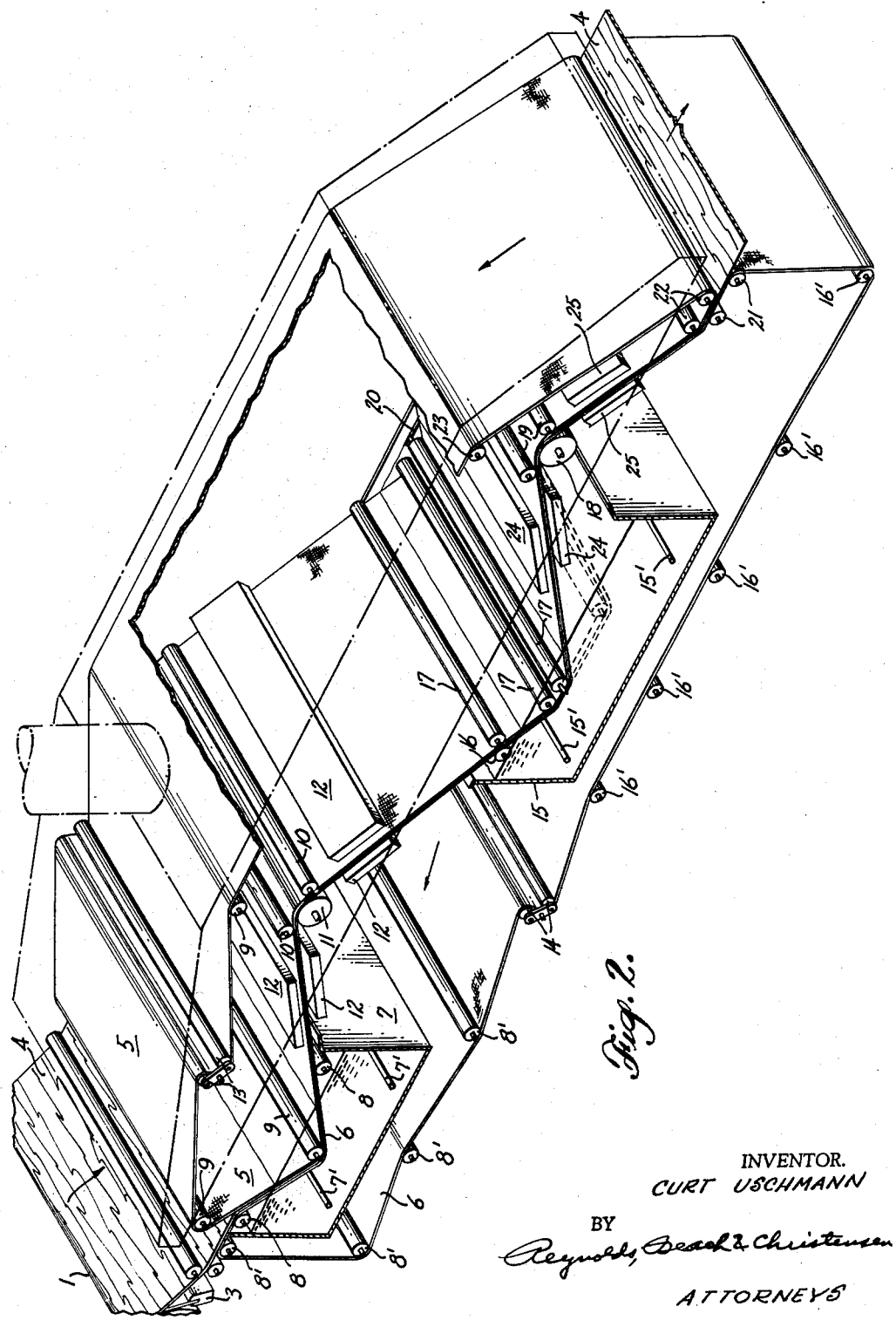

3,076,738
METHOD OF TREATING AND LAMINATING GREEN WOOD VENEER
Curt Uschmann, Rte. 3, Lebanon, Oreg.
Filed Jan. 30, 1959, Ser. No. 790,197
7 Claims. (Cl. 156—331)

The method of the present invention is utilized for manufacturing a laminated product from thin sheets of wood veneer or hardboard or a combination of wood veneer and hardboard. This application is a continuation-in-part of my prior application Serial No. 494,550, filed March 15, 1955, now abandoned.

As used in this specification the term "hardboard" refers to a synthetic woody material, produced by reducing wood to fibrous or granular form and securing the particles together into a solid body of more or less dense character by the application of heat and pressure usually in conjunction with an adhesive, having a density exceeding 0.9 and preferably of a density of approximately 1.15.

In the manufacture of laminated products, the laminations may all be of wood veneer or some may be of wood veneer and some of hardboard. When all of the plies are of wood veneer, as in the manufacture of plywood, it is customary for the grain of adjacent laminations to be arranged in crossing relationship to increase the strength of the finished product. Customarily wood veneer and hardboard sheets are quite dry when they are ready to be assembled by the application of glue to them. Veneer sheets, particularly if peeled in rotary fashion from a log, are cut while the wood is wet and then dried before they are assembled. Hardboard sheets are dried in a pressing operation as an incidental part of the manuufacturing operation.

An important object of the present invention is to eliminate the necessity of drying veneer sheets by conventional air drying operations in preparing them for assembly into a laminated product.

A further object is to apply bonding resin to veneer sheets and/or hardboard sheets in a manner and of a type which will enable a laminated product to be made of such sheets a considerable time after the application of such resin to the sheets.

Specifically it is an object to treat woody hard sheet material, whether plywood or hardboard, as distinguished from woody soft material such as pulp or insulating board, with an inexpensive resin which can be dried on the sheet and thereafter can be bonded to another sheet by the application of heat and pressure without the application of additional resin.

A further object is to utilize a resin for impregnating woody material which will increase the density, strength, waterproof character and bonding affinity of the material.

It is a further object of the present invention to prepare veneer for its incorporation in plywood by a continuous process from the cutting of the veneer from the log to its discharge from the process ready to be laid up as laminations for insertion into a press.

The process of the present invention involves two principal steps, first that of preparing a sheet of woody material, whether of veneer or hardboard, in reasonably dry form, and second the impregnation of such sheet of woody material with resin which will increase the density, stabilize the sheet against appreciable change in shape or dimensions caused by changes in atmospheric temperature or humidity, and which will enable the sheets to be bonded together without the addition of other adhesive. In preparing veneer during the first step, most of the water is expelled from the veneer by passing it through a bath containing a solution of melamine resin in alcohol after which the veneer is heated to a temperature sufficient to evaporate the alcohol from the wood. In the second step, the veneer or hardboard sheet is impregnated with resin including melamine and/or sulphite liquor resin for the purpose of densifying and stabilizing the sheet of woody material and enabling it to be bonded without the addition of other adhesive at a future time. The first step can be performed entirely independently of the second step, or the two steps can be performed in immediate sequence.

FIGURE 1 shows diagrammatically apparatus for performing the first step of the process alone, and FIGURE 2 shows diagrammatically apparatus for performing the two steps in sequence.

The process is illustrated in the drawing as applied to peeled veneer shaved from a log 1 supported and rotated by a veneer lathe 2. The veneer is shaved from the periphery of the log by a knife blade 3 as the log is rotated. Such a log will be green and may actually be wet, having been just previously removed from a log storage pond. The log may be any of various species, Douglas fir being a common species of wood from which peeled veneer is made. Alternatively, the species may be cottonwood or some other variety.

The veneer sheet 4 peeled from the log, at least after the initial portion of the log has been removed, will be a continuous sheet. If desired, such sheet may be clipped to remove unsuitable portions. Also the sheet 4 may be removed from the log onto superposed conveyors at various levels. However the veneer sheet 4 is handled, it eventually, while still green, will be fed between an upper mesh belt 5 and a lower mesh belt 6 associated with a first-stage processing tank 7, as shown both in FIGURE 1 and FIGURE 2. The mesh belts 5 and 6 preferably will be of a width at least as great as the width of the veneer sheet 4 and such belts, in the direction of travel of the veneer, may be of any length. Also, the tank 7 may be of any corresponding length in the direction of travel of the veneer, depending upon the speed of travel of the veneer and the time during which it is desired to have the veneer remain in the solution in the tank.

The belt 6 is supported in the tank 7 by suitable guide rollers 8 and outside the tank by suitable guide rollers 8' which define the path of travel of the belt. The belt 5 is supported and guided by suitable rollers 9 located above the path of travel of the belt 6 and arranged so that the space between the upper stretch of belt 6 and the lower stretch of belt 5 is approximately the thickness of the veneer sheet 4. Some of the rollers 8' and 9 will be driven to effect movement of the two belts at the same linear speed for drawing the veneer sheet between the belts. Also, the conformation of the upper stretch of belt 6 and the lower stretch of belt 5 will be such that the veneer sheet 4 will be carried downward into the liquid bath within the tank 7, maintained in such liquid bath for the desired length of time and then withdrawn from the bath. The cooperation of the belts 5 and 6 will propel the veneer through the liquid in tank 7 in this fashion whether the veneer is in a single continuous sheet or in a succession of relatively narrow sheets.

The treating liquid in the tank 7 is a solution of melamine resin in alcohol. A melamine resin suitable for this purpose is No. 814 Resimene of Monsanto Chemical Company. This resin is of the melamine formaldehyde type and may be of any of various melamine aldehyde resins such as disclosed in United States Patents No. 2,260,239 and No. 2,310,004. The resin should be of a type which will dissolve readily in ethyl alcohol, butyl alcohol, acetone or benzyl alcohol, any of which may be used as solvents in my process, but I prefer to use ethyl alcohol. From one percent to twenty percent of the solution by weight should be resin.

The amount of resin used in the solution should be greater for species of wood with a coarse or open grain such as cottonwood in which case the amount of resin may be fifteen percent to twenty percent by weight of the solution, whereas for finer grain woods a smaller proportion of resin may be used, such as five percent to ten percent. Again, the smaller proportion of resin will be suitable for veneer cut from logs from trees which have grown slowly and the higher proportion of resin is desirable for trees which have grown more rapidly and in which the grain consequently is coarser. Similarly, a solution for treating heart wood of a particular species should contain less resin than a solution for treating sap wood of the same species and growth rate because heart wood is more dense and has in it less water than the sap wood. Consequently, it is desirable to utilize different tanks containing different solutions to process such different types of wood or to alter the solution in the tank 7 when changing from processing one type of wood to processing a different type of wood.

The resin solution in the tank 7 should be heated by any suitable heating arrangement, shown as steam pipes 7', to a temperature between 110 degrees Fahrenheit and 120 degrees Fahrenheit.

During passage of the veneer sheet through the tank 7 the alcohol and resin solution replaces most of the free water in the wood and the displaced water passes into the solution. In order to prevent the solution in the tank 7 from acquiring too great a proportion of water, therefore, the contents of the tank must be replaced periodically or, preferably, solution is withdrawn continually or at short intervals from the tank 7 at a predetermined rate and replaced with an equal amount of alcohol and resin solution containing only sufficient water to serve as a solvent for the resin. The solution containing water thus removed from the tank can be reprocessed reduce the amount of water, such as by fractional distillation, and the reconditioned solution returned to the tank 7.

In addition, the alcohol solvent from the solution which has saturated the veneer during its passage through the tank 7 can be recovered for reuse by passing the veneer through a heated zone. The veneer is carried through such zone by the mesh belts 5 and 6 guided by upper rolls 10 and lower rolls 11 between banks 12 of infrared lamps or steam-heated fin coils. The tension of the upper mesh belt 5 can be adjusted by a tightener 13 and the tension of the lower mesh belt 6 can be adjusted by a tightener 14 for initial adjustment and for various thickness of veneer, if necessary. Alternatively, dry air heated to a temperature of 250 degrees Fahrenheit to 275 degrees Fahrenheit may be blown onto the veneer. Whichever heating method is used, the temperature of the veneer should be raised sufficiently to evaporate the alcohol solvent from it, leaving the resin, which has a higher evaporating temperature than the solvent, deposited within the grain structure of the veneer. Evaporation of such solvent requires much less heat and a substantially lower temperature than would be required to evaporate directly sufficient free moisture from the veneer to reduce the moisture content of the veneer to an equally low value. The solvent thus evaporated can be recovered by collecting the vapor in a hood shown in phantom in the drawings and condensing it for reuse in making replacement solution for the tank 7.

Veneer properly treated as described will have a free water content comparable to that of veneer dried conventionally ready for the application of glue in the usual plywood making process. That is, it will contain not more than ten to fifteen percent water by weight. The speed with which this result can be accomplished depends upon the thickness of the veneer. Thus, Douglas fir veneer one-sixteenth of an inch thick can have its moisture content reduced to this level if it remains in the solution in tank 7 for only approximately one minute. It is necessary for thicker veneer to remain in the tank for a much longer period of time in order to achieve the same results. Thus, Douglas fir veneer one-eighth of an inch thick must remain in the tank solution for seven to ten minutes, depending upon the fineness of the grain and whether it is heart wood or sapwood, and Douglas fir veneer one-quarter of an inch thick must remain in the solution for a period of twenty-five to thirty minutes. Such increase in treatment time can be obtained either by utilizing a longer tank 7 or by moving the veneer through the tank more slowly.

In FIGURE 1 the veneer emerging from the heated zone of the first stage treatment is discharged from between the belts 5 and 6 and can be subjected later to a second stage treatment or used in a manner and for a purpose for which conventionally dried veneer would normally be used. In FIGURE 2 the second stage treatment of the veneer is shown as following immediately after the step of evaporating the solvent from the wood as described above, and this is desirable for economy in handling the veneer. This subsequent treatment is suitable not only for veneer prepared in accordance with the foregoing description but also can be used for veneer dried conventionally or for hardboard. Because of the resin which would be deposited in the cells of the wood by the treatment described above, the veneer need not be as dry as would be necessary if no resin had been included in the bath in tank 7.

The second stage of the treatment effected by passing the woody sheet material, whether of veneer or hardboard, through a solution in a further tank 15 is for the purpose of thoroughly impregnating the sheet with resin of a type which will bond under heat and pressure whether that heat and pressure is applied before or after the impregnating resin has dried. The sheet material can be passed through the solution in this second tank by a continuation of the mesh belts 5 and 6 employed for moving the veneer through the first tank 7 as described above. Thus, the belt 6 may be supported by rollers 16 to move through the tank. The lower stretch of the upper belt 5 overlying the veneer is supported by the veneer and lower belt and guided by rollers 17. The contour of the lower stretch of belt 5 and the upper stretch of belt 6 will be such as to move sheets passing between these belts downward into the solution in tank 15.

The solution in the tank 15 may be ten to sixty percent by weight of melamine resin of the same general type as used in tank 7 dissolved in approximately equal parts by weight of solvent and water. Such solvent preferably is ethyl alcohol but, again, may be any of the melamine resin solvents such as can be utilized in tank 7 as discussed above. Thus, for example, a solution could contain fifty pounds of alcohol, fifty pounds of water and ten pounds of dry melamine resin which, when mixed together, would give a ten percent solution of resin in the alcohol and water. On the other hand, if into the same combined alcohol and water solvent sixty pounds of resin were placed and stirred until dissolved, the solution would contain by weight sixty percent as much resin dry measure as liquid. If desired, methyl alcohol may be used as the solvent with a suitable melamine resin in conjunction with water. In order to obtain adequate impregnation with resin, the sheet material should be immersed in tank 15 for a length of time depending upon the type and species of wood being processed. As has been pointed out earlier, the absorptivity of the wood will depend upon its type of grain. For open grained wood, the passage of the veneer through tank 15 should take at least as long as its passage through tank 7, and for close grained woods, a longer time will be required depending upon how tight the grain structure is.

Because of the difference in grain structure of veneer and hardboard which may be processed in tank 15, particularly if such tank is available for use separately from tank 7, the time of immersion in the tank can be adjusted as desired. If the tank 15 and its sheet immersing mesh belts are entirely separate from the installation for tank 7, the time during which the sheet material is immersed in the tank 15 can be varied simply by altering the speed of drive of the belts. In an installation such as shown in FIGURE 2 where the same mesh belts carry the veneer through both tanks, the speed of travel of the belts through the two tanks will, of course, be the same. The time of treatment in tank 7 in that instance can be varied by adjusting the spacing of the central rollers 17 as indicated in broken lines in FIGURE 2.

The lower belt 6 passes over a roller 18 at the discharge end of the tank 15. The upper belt 5 is held in proper relationship to the roller 18 by rollers 19. As the adjacent roller 17 is moved to the right as seen in FIGURE 2 toward the broken line position, the ends of its axle sliding in guide grooves 20, a greater stretch of the belts will be immersed in the liquid of the tank. An appropriate adjustment can be made for the increased length of belt required in thus moving such roller by swinging the tighteners 13 and 14 correspondingly in a direction to loosen the belts. It is not necessary to move the lower guide rollers 16' and the end guide rollers 21 for the portion of the lower belt 6 beneath tank 15 or the end guide rollers 22 and upper guide roller 23 for the upper belt 5.

It is desirable to heat the solution in tank 15 slightly above room temperature preferably in the range of 80 degrees Fahrenheit to 100 degrees Fahrenheit. Such heating may be effected by the steam pipes 15' immersed in the tank. As the sheet material emerges from the tank, it is heated to dry the resin by banks of infrared lamps or steam heated fin coils 24 above and below the stretches of belts 5 and 6 moving upward out of the tank and these heaters will be suitably supported for adjustment to maintain the proper relationship to the mesh belts for various adjusted positions of the adjacent roller 17. The mesh belts and sheet material between them subsequently passes between additional heaters 25 of similar type so that the sheet will be at least substantially dry when it is discharged from between the mesh belts. A vapor collecting hood is indicated in phantom in FIGURE 2 as extending over the region of both tanks 7 and 15 to collect solvent vapor evaporated from the sheet material. Preferably the same type of solvent alcohol is used for the treating liquid in both tanks. Such vapor can then be condensed for use in making replacement solution for either or both of these tanks.

After the resin impregnated sheet material has been removed from the tank 15, such sheets may be bonded with each other or with untreated sheets between them while the resin is still damp or the resin may be allowed to dry for an indeterminate period. An effective bond can be made even though the sheets to be bonded are not compacted under heat and pressure for a period of several months or as much as a year after the resin impregnating treatment. Such bonding may be performed in a conventional hot plywood press at a temperature of 300 degrees Fahrenheit to 375 degrees Fahrenheit and under a pressure of approximately 200 to 800 pounds per square inch depending upon the type of wood, its thickness and the end product desired. Such temperature may also depend upon whether the sheets are all of wood veneer or some or all of them are of hardboard.

It will be found that the resulting product is waterproof such as required for marine type plywood. The bond between the sheets will not be affected adversely by being soaked in water, however long, and the dimensions of the laminated product will not change appreciably despite changes in atmospheric humidity or temperature or both. Representative pressing cycles may be as follows for making laminated panels of veneer or hardboard sheets or a combination of veneer and hardboard sheets.

⅜″ plywood composed of three ⅛″ plies:
    5 minutes at 250 p.s.i. pressure
    1 minute at 50 p.s.i. pressure
    1 minute at 0 p.s.i. pressure
    7 minutes total ¾″ plywood composed of three ⅛″ plies and two ³⁄₁₆″ plies:
    7 minutes at 250 p.s.i. pressure
    2 minutes at 50 p.s.i. pressure
    1 minute at 0 p.s.i. pressure
    10 minutes total 1″ plywood composed of eleven ¹⁄₁₀″ plies:
    20 minutes at 300 p.s.i. pressure
    3 minutes at 50 p.s.i. pressure
    2 minutes at 0 p.s.i. pressure
    25 minutes total If overlays of resin impregnated paper or resin impregnated glass fiber cloth are used on opposite sides of the panel, higher pressures may be required during the first portion of the pressing operation.

Instead of using melamine resin alone for the second stage of the treatment process in tank 15, waste sulphite liquor resin can be used, but for certain purposes such resin may not be as desirable as melamine resin because melamine resin is of light color whereas such waste sulphite liquor resin is of dark color. A waste sulphite liquor resin suitable for the impregnating treatment described may be produced by concentrating waste sulphite liquor and treating it in the manner described in my Patent No. 2,585,977 or in my patent application Serial No. 272,159. Such resin may contain fifteen percent to forty percent by weight of solids, a preferred concentration being twenty-five percent of solids by weight. To ten gallons of such resinified waste sulphite liquor is added one to three gallons of methyl alcohol or ethyl alcohol or a mixture of the two. Such alcohol content increases the penetration ability of the resin and accelerates drying. Such a resin solution is applied to the woody material in the manner described above for treatment with melamine resin solution. In order to assist penetration of such sulphite liquor resin it is preferable to have the temperature of the solution hotter than the melamine resin solution, such as approximately 140 degrees Fahrenheit.

Instead of using a solution of melamine resin alone or of sulphite liquor resin alone, in the second stage treatment in tank 15 a combination of such two resins can be used. While it is preferred that the solvent contain approximately equal parts by weight of alcohol and water, such proportions may be varied within a reasonable range such as utilizing from forty percent to sixty percent by weight of water and the remainder of the solvent being alcohol or a combination of alcohols mentioned above in any proportion.

For economy, it may also be desirable in some cases to use a combination of resins because melamine resin is comparatively expensive. Thus, the desired results for the second stage treatment may be obtained by combining with melamine resin or sulphite liquor resin a phenolic resin, for example MB13 of the Borden Chemical Company. This is an alkali condensed resin dilutable with water. A suitable combination, for example, would be one-third by weight of each of melamine resin, such as No. 814 Resimene of Monsanto Chemical Company, phenolic resin, such as MB13 of the Borden Chemical Company, and sulphite liquor resin, such as disclosed in my Patent No. 2,585,977 and in my copending application Serial No. 272,159. Phenol formaldehyde resin alone cannot be used, however, to achieve the purposes of the present invention because it must be set under heat and pressure before the resin has dried.

While it is preferred to continue the treatment of veneer processed according to the first stage of treatment described above by thereafter processing it in accordance with the second stage of treatment described, it would be quite practical at any time after completion of the first stage of treatment to utilize the veneer thus processed for manufacturing plywood according to conventional practice by spreading liquid glue on it and bonding it under heat and pressure before the glue has dried. Such glue may either be of the exterior type or of the interior type conventionally used in the manufacture of plywood. The resin with which the cells of the wood have been impregnated during the first stage of treatment will greatly deter absorption of moisture from the atmosphere by the veneer so that no further drying of the veneer would be required for such conventional plywood manufacture even though the veneer should be exposed to humid air conditions for a considerable period of time prior to the plywood manufacturing operation.

It should be emphasized, however, that where sheet material is subjected to the second step of the process it can be bonded by the application of heat and pressure in the manner described above without the application to any of the sheets of additional binder such as used in the usual manufacture of laminated panels such as plywood.

I claim as my invention:

1. The method of treating green wood veneer comprising submerging such green wood veneer in a solution of resin selected from the group consisting of melamine aldehyde resin and sulfite liquor resin dissolved in an aqueous solvent including at least about forty percent as much alcohol as water by weight.

2. The method of making a laminated panel comprising submerging sheets of green wood veneer in a solution of resin selected from the group consisting of melamine aldehyde resin and sulfite liquor resin dissolved in an aqueous solvent including at least about forty percent as much alcohol as water by weight, and thereafter superimposing such sheets without the application of additional binder thereto and subjecting them to heat and pressure for bonding such sheets together solely by the resin acquired by such sheets from said resin solution.

3. The method of treating veneer comprising submerging green wood veneer in an aqueous solution of melamine aldehyde resin containing at least about forty percent as much alcohol as water by weight for displacing water from such veneer by such solution.

4. The method of treating veneer comprising submerging green wood veneer in an aqueous solution of melamine aldehyde resin containing at least about forty percent as much alcohol as water by weight for displacing water from such veneer by such solution, and thereafter heating the veneer and thereby evaporating alcohol therefrom leaving such resin deposited in the veneer.

5. The method of making plywood which comprises submerging green wood veneer in an aqueous solution of melamine aldehyde resin containing at least about forty percent as much alcohol as water by weight, heating the green veneer and thereby evaporating alcohol and water therefrom while leaving resin deposited in the veneer, thereafter submerging the veneer in a solution of resin selected from the group consisting of melamine aldehyde resin and sulfite liquor resin dissolved in a solvent of alcohol and water, and thereafter superimposing sheets of the veneer and subjecting them to heat and pressure without the addition of further binder for bonding the sheets together by resin deposited on the veneer sheets from the second resin solution.

6. The method of making a laminated panel comprising submerging sheets of green wood veneer in an aqueous solution of melamine aldehyde resin containing at least about forty percent as much alcohol as water by weight for displacing water from such veneer by such solution, thereafter heating the veneer and thereby evaporating alcohol therefrom leaving such resin deposited in the veneer, and thereafter superimposing such sheets without the application of additional binder thereto and subjecting them to heat and pressure for bonding such sheets together solely by the resin acquired by such sheets from said resin solution.

7. The method of making a laminated panel comprising submerging sheets of green wood veneer in a solution of resin selected from the group consisting of melamine aldehyde resin and sulfite liquor resin dissolved in an aqueous solvent including at least about forty percent as much alcohol as water by weight for displacing water from such veneer by such solution, thereafter heating the veneer and thereby evaporating alcohol therefrom leaving such resin deposited in the veneer, and thereafter superimposing such sheets without the application of additional binder thereto and subjecting them to heat and pressure for bonding such sheets together solely by the resin acquired by such sheets from said resin solution.

References Cited in the file of this patent

UNITED STATES PATENTS

| | | |
|---|---|---|
| 2,442,422 | Loetscher | June 1, 1948 |
| 2,473,463 | Adams | June 14, 1949 |
| 2,497,712 | Auchter | Feb. 14, 1950 |
| 2,500,783 | Anderson et al. | Mar. 14, 1950 |
| 2,579,985 | Varela et al. | Dec. 25, 1951 |
| 2,615,003 | Suen et al. | Oct. 21, 1952 |
| 2,629,648 | Ericks | Feb. 24, 1953 |
| 2,768,109 | Coover | Oct. 23, 1956 |
| 2,786,008 | Herschler | Mar. 19, 1957 |
| 2,860,070 | McDonald | Nov. 11, 1958 |